United States Patent

Kirchmeyer et al.

[11] Patent Number: 5,672,673
[45] Date of Patent: Sep. 30, 1997

[54] FLUORINE-CONTAINING DISPERSANTS FOR AQUEOUS PAINTS AND COATING COMPOSITIONS

[75] Inventors: Stephan Kirchmeyer, Leverkusen; Jan Mazanek, Köln; Karl-Heinz Käsler, Bergisch Gladbach, all of Germany

[73] Assignee: Bayer Aktiengesellschaft, Leverkusen, Germany

[21] Appl. No.: 666,724

[22] Filed: Jun. 17, 1996

[30] Foreign Application Priority Data

Jun. 21, 1995 [DE] Germany ............... 195 22 476.0

[51] Int. Cl.⁶ .................................................. C08G 18/12
[52] U.S. Cl. ............... 528/70; 524/500; 524/507; 524/539; 524/591; 528/49
[58] Field of Search ............ 528/49, 70; 524/591, 524/507, 539, 500

[56] References Cited

U.S. PATENT DOCUMENTS 3,255,131  6/1966  Ahlbrecht et al. ................ 260/22
3,872,058  3/1975  Gresham ...................... 260/77.5 AM
4,732,618  3/1988  Spietschka et al. .............. 106/288 Q
4,762,752  8/1988  Haubennestel et al. ............ 428/407
4,929,705  5/1990  Mazanek et al. .................. 528/49

FOREIGN PATENT DOCUMENTS

93/01349  1/1993  WIPO .
93/17165  9/1993  WIPO .

*Primary Examiner*—Rachel Gorr
*Attorney, Agent, or Firm*—Joseph C. Gil; Thomas W. Roy

[57] ABSTRACT

A method for the preparation of water-soluble polyaddition compounds containing perfluoroalkyl groups by the reaction of a polyisocyanate component A) with a fluorine-containing alcohol component B), hydrophilic monohydric polyether alcohols C), isocyanate-reactive tertiary amines D) and optionally other isocyanate-reactive components E) at an NCO index of 80 to 200, the resulting polyaddition compounds and their use as dispersants for incorporating solid substances into aqueous paints and coating compositions.

13 Claims, No Drawings

FLUORINE-CONTAINING DISPERSANTS FOR AQUEOUS PAINTS AND COATING COMPOSITIONS

BACKGROUND OF THE INVENTION

1. Field of the Invention

The present invention relates to a method for the preparation of water-soluble polyaddition compounds containing perfluoroalkyl groups, to the resulting compounds and to their use as dispersants for incorporating solid substances into aqueous paints and coating compositions.

2. Description of the Prior Art

Strong mechanical forces are necessary to incorporate solid substances into liquid media. This depends to a large extent on the wettability of the solid substance by the surrounding medium as well as its affinity to this medium. In order to reduce these dispersing forces it is known to use dispersants, which facilitate the incorporation. The dispersants are mostly surface-active substances, also called surfactants, having an anionic, cationic or nonionic structure. Relatively small quantities of these substances are either applied directly to the solid substance or added to the dispersing medium. The energy for dispersing is considerably reduced by such a surfactant.

It is also known that these solid substances tend to reagglomerate again after the dispersion process, which destroys the dispersion energy previously applied and leads to serious problems. This occurrence is explained by London/van der Waals forces, by which the solid substances are mutually attracted. These attractive forces may be overcome as the surfactants are adsorbed by the solid substances.

However, during and after dispersion an interaction of the surrounding medium with the solid particles occurs such that the surfactant is desorbed in exchange for the surrounding medium, which is present at a higher concentration. Because in most cases the surrounding medium cannot build up stable adsorbed layers, the entire system breaks down. This becomes noticeable, for example, by increased viscosity in liquid systems and by losses of gloss and displacements of shade in paints and coatings.

There have been many attempts to provide effective dispersants for solid substances, in particular pigments, which facilitate in particular the incorporation of these solid substances into solvent-containing paints and permit the preparation of coatings that do not sediment. Examples of such dispersants are described, for example, in EP-A-0,154,678, EP-A-0,205,510 and EP-A-0,335,197.

It is an object of the present invention to provide suitable dispersants for incorporating solid substances, in particular pigments, into aqueous paints and coating compositions.

This object may be achieved with the water-soluble polyaddition compounds containing perfluoroalkyl groups of the present invention and their method of production. These water-soluble polyaddition compounds containing perfluoroalkyl groups, whose solubility in water is ensured by ethylene oxide units incorporated in a quantity of at least 30 wt. %, are eminently suitable as dispersants and particularly as wetting agents, suspending agents and flow-control agents for incorporating solid substances into aqueous paints and coating compositions, and for paints and coating compositions that contain these solid substances in dispersed form.

SUMMARY OF THE INVENTION

The present invention relates to a process for the preparation of water-soluble polyaddition compounds containing perfluoroalkyl groups by reacting A) a polyisocyanate component having an average NCO functionality of at least 2.5 and an NCO content of 5 to 50 wt. % with B) 0.1 to 50 equivalent %, based on the equivalents of isocyanate groups present in component A), of a fluorine-containing alcohol component corresponding to the formula $$R^f-SO_2-N-(AO)_r-H, \quad (I)$$
$$\underset{R^1}{|}$$

wherein $R^f$ represents a perfluoroalkyl group having 4 to 20 carbon atoms, $R^1$ represents an alkyl group having 1 to 6 carbon atoms, AO represents an alkylene oxide radical having 2 to 10 carbon atoms and r is a number from 1 to 3, C) 5 to 90 equivalent %, based on the equivalents of isocyanate groups present in component A), of a monohydric alcohol component containing one or more monohydric polyether alcohols which have a number average molecular weight of 150 to 5000 and an ethylene oxide content of 50 to 99.5 wt. %, and have been prepared by alkoxylation of a monohydric starter molecule, provided that component C) is present in an amount such that the resulting polyaddition compounds contain at least 30 wt. % of ethylene oxide units incorporated via component C), D) 5 to 80 equivalent %, based on the equivalents of isocyanate groups present in component A), of an amine component containing at least one tertiary amine having a molecular weight of 88 to 250 and containing at least one isocyanate-reactive group and E) 0 to 40 equivalent %, based on the equivalents of isocyanate groups present in component A), of one or more compounds which contain one or more isocyanate-reactive groups, are different from components B) to D), and have ethylene oxide content of less than 50 wt. % and a number average molecular weight of 32 to 3000, at an isocyanate index of 80 to 200 to form urethane and optionally urea groups, and optionally reducing any NCO groups present in excess to a maximum content of 1.0 wt. % by means of secondary reactions carried out simultaneously or subsequently to the formation of the polyaddition compounds.

The invention also relates to the resulting polyaddition compounds and to their use as dispersants for incorporating solid substances into aqueous paints or coating compositions.

DETAILED DESCRIPTION OF THE INVENTION

Polyisocyanate component A) has an average NCO functionality of at least 2.5, preferably at least 3.0, and an NCO content of 5 to 50 wt. %, preferably 7 to 30 wt. %. Polyisocyanate component A) is selected from higher functional, unmodified polyisocyanates and the known modification products of these polyisocyanates, preferably diisocyanates.

Unmodified polyisocyanates suitable as component A) include the higher functional polyisocyanates of the diphenylmethane series, which are obtained in addition to the corresponding diisocyanates during the phosgenation of aniline/formaldehyde condensates such as 4,4',4"-triisocyanatotriphenylmethane.

Preferably, the polyisocyanates of component A) are selected from the modification products of monomeric polyisocyanates. "Modification products" are derivatives of monomeric polyisocyanates, preferably diisocyanates, containing biuret groups, urethane groups, allophanate groups and/or isocyanurate groups. Diisocyanates used for the preparation of these derivatives include hexamethylene diisocyanate, cyclohexane-1,3-and/or cyclohexane-1,4-diisocyanate, 1-isocyanato-3,3,5-trimethyl-5-isocyanatomethylcyclohexane, 2,4-and/or 2,6-hexahydrotolylene diisocyanate, perhydro-2,4'-and/or -4,4'-diphenylmethane diisocyanate, 2,4-and/or 2,6-tolylene diisocyanate, diphenylmethane-2,4'-and/or-4,4'-diisocyanate and naphthylene-1,5-diisocyanate.

More preferably, commercially available diisocyanates are used to prepare the modified diisocyanates, such as 2,4-diisocyanatotoluene and mixtures thereof with up to 35 wt. %, based on the mixture, of 2,6-diisocyanatotoluene; 4,4'-diisocyanatodiphenylmethane and mixtures thereof with 2,4'-and/or 2,2'-diisocyanatodiphenylmethane; hexamethylene diisocyanate; and mixtures of these diisocyanates. The polyisocyanates of component A) are most preferably the modification products containing isocyanurate groups and prepared from 2,4-diisocyanatotoluene and mixtures thereof with up to 35 wt. %, based on the mixture, of 2,6-diisocyanatotoluene. These particularly preferred polyisocyanates containing isocyanurate groups preferably have an NCO content of 12 to 24 wt. % and an NCO functionality of 3 to 6. Polyisocyanate component A) is preferably used in the form of a solution in an inert solvent such as butyl acetate.

Starting component B) is selected from compounds corresponding to formula (I), wherein the variables are as defined above. Preferred starting components B) are those for which R$^f$ represents a perfluoroalkyl group having 4 to 10 carbon atoms, R$^1$ represents an alkyl radical having 1 to 3 carbon atoms, AO represents an alkylene oxide radical having 2 or 3 carbon atoms, in particular an ethylene oxide radical and r is 1.

Specific examples of compounds which can be used as component B) include N-methyl-N-(2-hydroxyethyl)-1-perfluorobutane sulphonamide, N-ethyl-N-(2-hydroxyethyl)-1-perfluorobutane sulphonamide, N-propyl-N-(2-hydroxyethyl)-1-perfluorobutane sulphonamide, N-methyl-N-(2-hydroxyethyl)-1-perfluoropentane sulphonamide, N-ethyl-N-(2-hydroxyethyl)-1-perfluoropentane sulphonamide, N-methyl-N-(2-hydroxyethyl)-1-perfluorohexane sulphonamide, N-ethyl-N-(2-hydroxyethyl)-1-perfluorohexane sulphonamide, N-propyl-N-(2-hydroxyethyl)-1-perfluorohexane sulphonamide, N-methyl-N-(2-hydroxyethyl)-1-perfluoroheptane sulphonamide, N-ethyl-N-(2-hydroxyethyl)-1-perfluoroheptane sulphonamide, N-butyl-N-(2-hydroxyethyl)-1-perfluoroheptane sulphonamide, N-(2-hydroxyethyl)-1-perfluorooctane sulphonamide, N-methyl-N-(2-hydroxyethyl)-1-perfluorooctane sulphonamide, N-ethyl-N-(2-hydroxyethyl)-1-perfluorooctane sulphonamide, N-1-methylethyl-N-(2-hydroxyethyl)-1-perfluorooctane sulphonamide, N-propyl-N-(2-hydroxyethyl)-1-perfluorohexane sulphonamide, N-butyl-N-(2-hydroxyethyl)-1-perfluorooctane sulphonamide, N-ethyl-N-(2,3-dihydroxypropyl)-1-perfluorooctane sulphonamide, N-propyl-N-(2,3-dihydroxypropyl)-1-perfluorooctane sulphonamide, N-ethyl-N-(2-hydroxyethyl)-1-perfluorononane sulphonamide, N-propyl-N-(2-hydroxyethyl)-1-perfluorodecane sulphonamide and N-propyl-N-(2-hydroxyethyl)-1-perfluorodecanone sulphonamide.

Preferred starting compounds B) are N-methyl-and N-ethyl-N-(2-hydroxyethyl)-1-perfluorobutane sulphonamide as well as N-methyl-and N-ethyl-N-(2-hydroxyethyl)-1-perfluorooctane sulphonamide.

Starting component B) is used in a quantity of 0.1 to 50, preferably 1 to 40 equivalent %, based on the equivalents of NCO groups present in component A).

Monohydric alcohol component C) is selected from monohydric alcohols having a number average molecular weight (which may be calculated from the hydroxyl group content) of 150 to 5000, preferably 500 to 3000, and containing 50 to 99.5 wt. %, preferably from 70 to 99.5 wt. %, based on the total weight of the monohydric alcohol, of ethylene oxide units incorporated within polyether chains. Examples include the known alkoxylation products of monohydric starter molecules. These alkoxylation products have an average of at least 3, preferably 7 to 100, alkylene oxide units containing at least 50 wt. %, preferably 70 to 100 wt. %, of ethylene oxide units.

Suitable starter molecules for the preparation of these monohydric polyether alcohols are preferably monofunctional alcohols, phenols or carboxylic acids. The starter molecules generally contain 1 to 30, preferably 1 to 10 and more preferably 1 to 4 carbon atoms. Examples include monofunctional alcohols such as methanol, ethanol, n-propanol, n-butanol, 1-pentanol, 1-hexanol, 1-octanol, oleyl alcohol and benzyl alcohol; phenols such as phenol, cresols, methyl-phenols, nonylphenols and dodecylphenols; and acids which can be alkoxylated such as acetic acid, butyric acid, capric acid, lauric acid, palmitic acid, stearic acid and cyclohexane-carboxylic acid. The preferred starter molecules are monohydric alcohols having 1 to 4 carbon atoms.

Ethylene oxide or mixtures of ethylene oxide together with up to 50 wt. %, preferably up to 30 wt. %, based on the total weight of alkylene oxides, of other alkylene oxides, in particular propylene oxide, are used for the known alkoxylation reactions. If these other alkylene oxides are used, the polyethers may be prepared from mixtures of ethylene oxide with these alkylene oxides or the various alkylene oxides may be added sequentially resulting in the formation of segments.

Starting component C) is used in a quantity of 5 to 90, preferably 20 to 80 equivalent %, based on the equivalents of NCO groups present in component A).

Component D) is selected from organic compounds which contain at least one tertiary amino group and one isocyanate-reactive group, preferably a hydroxyl or amino group. These compounds generally have a molecular weight of 88 to 250, in particular 88 to 150.

Examples include N,N-diethylethanolamine, N,N-dimethyl-ethanolamine, N,N-dimethylisopropanolamine, N,N-dimethyl-1,3-propanediamine, N,N-diethylethylenediamine, 2-dibutylaminoethanol, 3-(dimethylamino)-1-propanol, 1-methylpiperazine, 1-methyl-4-piperidinol, 2-morpholinoethanol, 2-piperidinoethanol, 2-piperazinoethanol, 2-piperazinoethylamine, 3-morpholinopropylamine, N,N-dibutyltrimethylenediamine, 3-(diethylamino)-1-propanol, N-methyl-3-pyrrolidinol, 2-(hydroxymethyl)-N- methylpiperidine, N,N-dimethylethylenediamine, N,N-diethyl-1,4-butanediamine or N-methylpiperazine.

Preferred compounds for use as component D) include 4-(2-hydroxyethyl)pyridine, 2-hydroxy-ethylmorpholine, N,N-dimethyl-1,3-propanediamine, N,N-diethyl-1,4-butane-diamine, N,N-dimethylaminoethanol and N,N-dimethylaminopropylamine.

Starting component D) is used in a quantity of 5 to 40, preferably 5 to 30 equivalent %, based on the equivalents of isocyanate groups present in component A). Preferably component D) is used in an amount sufficient to provide 2 to 200, preferably 5 to 100, milliequivalents of tertiary amino groups per 100 g of resin solids.

Optional starting component E) is selected from organic compounds having a number average molecular weight (which may be calculated by end group analysis) of 32 to 3000, preferably 118 to 2000, and having one or two isocyanate-reactive groups, preferably one or two alcoholic hydroxyl groups. Examples include the known polyester diols and polyether diols. Preferred examples are are monohydric alcohols having a preferred molecular weight of 130 to 2000, which may be obtained by the known addition of e-caprolactone to monohydric alcohols, such as those previously set forth as starter molecules in connection with component C).

Component E) is used in a quantity of 0 to 40, preferably 0 to 10 equivalent %, based on the equivalents of isocyanate groups present in component A). Most preferably, component E) is not used.

The composition and amounts of the starting materials are selected so that the resulting polyaddition products have a fluorine content of 0.5 to 50 wt. %, preferably 0.7 to 20 wt. % and more preferably 0.7 to 10% by weight; an ethylene oxide content of 30 to 95 wt. %, preferably 50 to 85 wt. %; and a tertiary amino group content of 2 to 200, preferably 5 to 100 milliequivalents per 100 g of resin solids.

In accordance with the process of the present invention polyisocyanates A) are reacted with compounds B), C), D) and optionally E) in one or more stages at 20° to 250° C., preferably at 60° to 140° C., at an equivalent ratio of isocyanate groups of component A) to isocyanate-reactive groups of components B) to E) of 0.8:1 to 2.0:1, preferably 0.9:1 to 1.7:1 and more preferably 1:1 to 1.6:1. This corresponds to NCO index of 80 to 200, preferably of 90 to 170 and more preferably of 100 to 160.

The process according to the present invention may be carried out in a one-step process by reacting polyisocyanate component A) with a mixture of components B), C), D) and optionally E), or in a two-step process by initially forming an NCO prepolymer from component A) and a portion of the co-reactants B) to E) and then reacting this prepolymer in a second stage with the remainder of the co-reactants having isocyanate-reactive groups.

If an excess of NCO groups, based on the isocyanate-reactive groups present in components B) to E), is used in the reaction, this excess can optionally be lowered by secondary reactions to a maximum residual content of 1.0 wt. %, preferably 0 wt. %. These secondary reacinclude the formation of allophanate groups, biuret groups and/or isocyanurate groups from the the excess NCO groups. These reactions may be catalyzed by the tertiary nitrogen atoms present and may be carried out by heating for 0.1 to 24 hours at 60° to 250° C.

Although the reaction, apart from the small amounts of solvents that are optionally used to dissolve component A), is preferably carried out in the melt, it is also possible to carry out the process in inert solvents, for example, to lower the viscosity. Examples of suitable solvents include dimethylformamide, N-methylpyrrolidone, dimethylacetamide, acetone, 2-butanone, ethyl acetate, ethyl butyrate, methoxypropylacetate, toluene and mixtures of these and other solvents. The solvents are preferably removed during or after the reaction, for example, by distillation.

Known catalysts that accelerate the isocyanate addition reaction may optionally also be used. Examples include triethylamine, N,N-dimethylbenzylamine and tin compounds such as tin(II) octoate and dibutyltin dilaurate.

The reaction can be carried out under normal pressure or at elevated pressure. The process may be carried out using standard equipment and procedures.

The polyisocyanate addition products essential to the invention are dispersants for solid substances, in particular pigments or fillers, used for the preparation of aqueous paints or coating compositions. The polyaddition compounds according to the invention are used in an amount of 0.1 to 20 wt. %, preferably from 0.5 to 10 wt. %, based on the weight of the solid substances. The compounds according to the invention can either initially be mixed with the solid substances to be dispersed, or dissolved directly in the dispersant (water) prior to or simultaneously with the addition of the solid substances. It is generally preferred, however, that the polyaddition compounds according to the invention be brought into contact with the solid substances by intimate mixing prior to the dispersion process.

The dispersants according to the invention are suitable for facilitating the dispersion of any desired solid substances, in particular pigments and fillers.

Examples of the pigments which may be mentioned in this connection are inorganic or organic pigments, as well as carbon blacks. Suitable pigments include inorganic pigments such as titanium dioxides, iron oxides and spinels; organic pigments such as azo dyes, dyes of the monoazo series, acetoacetic acid derivatives, derivatives of 2,3-oxynaphthyl acid, 2,3-oxynaphthyl arylamide derivatives, dyes of the diazo series, derivatives of 3,3-dichlorobenzidine, diaryl yellow types, condensed bisazo dyes, metal complex pigments, anthraquinoid dyes, phthalocyanine dyes and polycyclic dyes, in particular those of the anthraquinone, thioindigo, quinacridone, dioxazine, pyrrolopyrrole, naphthalenetetracarboxylic acid, pterylene, isoamidolin(on)e, flavanthrone, pyranthrone and isoviolanthrone series.

Preferred pigments are β-and γ-crystal modifications of the unsubstituted linear quinacridones as well as mixed crystals of 2,9-dimethylquinacridones and unsubstituted quinacridones.

The dispersants according to the invention are particularly preferred for the dispersion of carbon black in aqueous paint systems.

Fillers that can be dispersed according to the invention include those based on kaolin, talc, other silicates, chalk, glass fibers, glass beads and metal powders.

In accordance with the present invention the solid substances may be dispersed into any aqueous one-component or two-component paints or coating compositions. Examples include aqueous one-component compositions based on alkyd, acrylic, epoxy, polyvinyl acetate, polyester or polyurethane resins or aqueous two-component compositions based on (i) polyacrylic or polyester resins containing hydroxyl groups and (ii) melamine resins or optionally blocked polyisocyanate resins as cross-linking agents. Aqueous compositions based on polyepoxy resins are also suitable.

The polyisocyanate polyaddition compounds according to the invention can also be used as wetting agents or dispersants during the incorporation of solid substances, in particular pigments, into plastics formulations.

The following examples serve to further illustrate the present invention. All parts and percentages are by weight unless otherwise indicated.

EXAMPLES

Starting Materials:
Component A)
Polyisocyanate 1

A 51 wt. % solution in n-butyl acetate of a polyisocyanate containing isocyanurate groups, prepared from 2,4-diisocyanatotoluene, and having an NCO content, based on the solution, of 8 wt. % (Desmodur IL from Bayer AG)
Polyisocyanate 2
2,4-diisocyanatotoluene.
Component B)
Fluoroalcohol
N-methyl-N-(2-hydroxyethyl)-1-perfluorooctyl sulphonamide
Component C)
Polyol 1

A monohydric polyether alcohol having a number average molecular weight of 2250 and an ethylene oxide content of 87.5 wt. %, and prepared by the alkoxylation of n-butanol using a mixture of ethylene oxide and propylene oxide.
Polyol 2

A monohydric polyether alcohol having a molecular weight of 750 and an ethylene oxide content of 98 wt. %, and prepared by the ethoxylation of methanol.
Component D)
Amine 1
N,N-dimethyl-1,3-propanediamine.
Amine 2
N,N-dimethylethanolamine.
Amine 3
4-morpholinoethanol.

Examples 1 and 2 (according to the invention)

The quantity of polyol set forth in Table 1 was placed in a three-necked flask equipped with internal thermometer and mechanical stirring device and dehydrated for 2 hours at 120° C. and at a pressure of 10 mbar. The quantities of fluoroalcohol and isocyanate set forth in Table 1 were added at 70° C., the temperature was elevated to 100° C. and the mixture was stirred for 2 hours. The prepolymer formed was dissolved in 250 ml of acetone. The quantity of amine set forth in Table 1, in 50 ml of acetone, was placed in another three-necked flask and the flask was cooled to +15° C. The prepolymer solution was added dropwise in such a way that the internal temperature of the flask did not exceed +15° C. The solution was stirred for 15 minutes. A solution of a water-soluble polyaddition compound containing perfluoroalkyl groups was obtained, which can be used for the dispersion of pigments or for the dispersion and surface treatment of fillers.

Preparation of aqueous solutions

The solution of water-soluble polyaddition compounds containing perfluoroalkyl groups was placed in a three-necked flask equipped with internal thermometer, mechanical stirring device and distillation bridge, the quantity of water set forth in Table 1 was added and the solution was distilled at an internal temperature of 40° C. and at a pressure of approx. 80 mbar. Clear solvent-free solutions were obtained.

Examples 3 to 13 (method according to the invention)

The quantity of polyol set forth in Table 1 was placed in a three-necked flask equipped with internal thermometer, mechanical stirring device and distillation bridge and was dehydrated for 2 hours at 120° C. and at a pressure of 10 mbar. The quantity of isocyanate set forth in Table 1 was added at 70° C., the temperature was elevated to 100° C. and the mixture was stirred for 2 hours at this temperature. During this time all of the volatile substances were removed at a pressure of 10 mbar via the distillation bridge. The quantity of fluoroalcohol set forth in Table 1 was added and the mixture was stirred at 100° C. for 1 hour. The quantity of amine set forth in Table 1 was then added and the mixture was stirred for a further hour. A water-soluble polyaddition compound containing perfluoroalkyl groups was obtained, which can be used for the dispersion of pigments or for the dispersion and surface treatment of fillers.

Preparation of aqueous solutions

The compounds obtained in Examples 3 to 13 were dissolved with heating at 65° C. in the quantity of water set forth in Table 1. In all cases clear solutions were obtained.

TABLE 1

Quantities used for Examples 1 to 13

| Eg. | Polyol 1 | Polyol 2 | Fluoro-alcohol | Isocyanate 1 | Isocyanate 2 | Amine 1 | Amine 2 | Amine 3 | Water |
|---|---|---|---|---|---|---|---|---|---|
| 1 | 181.16 g | | 35.7 g | 128.76 g | | 5.05 g | | | 361.8 ml |
| 2 | 209.27 g | | 17.85 g | 107.81 g | | 5.05 g | | | 372.5 ml |
| 3 | 181.16 g | | 36.7 g | 128.76 g | | | 4.45 g | | 290.0 ml |
| 4 | 181.16 g | | 35.7 g | 128.76 g | | | | 6.65 g | 435.0 ml |
| 5 | | 124.0 g | 24.0 g | 72.94 g | 11.8 g | | 3.0 g | | 300.0 ml |
| 6 | 209.27 g | | 17.85 g | 107.81 g | | | 4.45 g | | 430.0 ml |
| 7 | 209.27 g | | 17.85 g | 161.97 g | | | 4.45 g | | 470.0 ml |
| 8 | 209.27 g | | 14.28 g | 102.21 g | | | 4.45 g | | 420.0 ml |
| 9 | 209.27 g | | 10.71 g | 96.62 g | | | 4.45 g | | 410.0 ml |
| 10 | 209.27 g | | 7.14 g | 91.04 g | | | 4.45 g | | 400.0 ml |
| 11 | 209.27 g | | 3.57 g | 85.45 g | | | 4.45 g | | 390.0 ml |
| 12 | 209.27 g | | 3.57 g | 89.72 g | | | 4.45 g | | 390.0 ml |
| 13 | 209.27 g | | 3.57 g | 94.0 g | | | 4.45 g | | 390.0 ml |

Examples 14 to 26 (Use)

Preparation of pigment pastes 15.0 g of black pigment (Farbruβ FW 200 from Degussa), 0.2 g of a defoaming agent (Nopco 803E4 from Münzig Chemie), 0.7 g of propylene glycol, 28.6 g of the wetting agent set forth in Table 2 and 150 g of glass beads (diameter=3 mm) were placed in a 300 ml round glass flask and dispersed by shaking for 90 minutes in a commercial disperser. The glass beads were then filtered off.

Preparation of paint, application and assessment 20 g of glass beads (diameter=3 mm), 5.0 g of pigment paste, 0.3 g of an antioxidant (Ascinin R conc. from Bayer AG), 45.0 g of an aqueous alkyd resin (Resydrol AY 586W from Vianova Kunstharz AG) and 3.0 g of a siccative (Octa Soligen Co 7 aqua from Borchers GmbH) were added to a 100 ml round glass flask and homogenized for 30 minutes in a disperser. After a curing time of approx. 12 hours, a coating having a wet film thickness of 100 μm was applied to a degreased glass plate. After storage for 1 day at room temperature, the haze gloss was determined in accordance with DIN 67530, ISO 2813, ASTM D 523 and the gloss was measured by Gardner's method (angle 20°).

TABLE 2

Use of the water-soluble polyaddition compounds containing perfluoroalkyl groups according to the invention

| Example | Wetting Agent from Example | Gloss 20° | Haze Gloss |
|---|---|---|---|
| 14 | 1 | 80.4 | 6.3 |
| 15 | 2 | 80.4 | 4.3 |
| 16 | 3 | 79.9 | 9.2 |
| 17 | 4 | 80.1 | 6.6 |
| 18 | 5 | 81.9 | 9.7 |
| 19 | 6 | 79.8 | 6.6 |
| 20 | 7 | 80.8 | 15.1 |
| 21 | 8 | 79.8 | 5.5 |
| 22 | 9 | 79.9 | 3.9 |
| 23 | 10 | 79.9 | 5.9 |
| 24 | 11 | 79.9 | 4.3 |
| 25 | 12 | 80.8 | 9.2 |
| 26 | 13 | 80.7 | 10.2 |
| Comparison | Solvent-containing wetting agent and dispersant from EP-OS 154 678 (U.S. Pat. No. 4,762,752) | 80.9 | 30.7 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparing a water-soluble polyaddition compound containing perfluoroalkyl groups which comprises reacting A) a polyisocyanate component having an average NCO functionality of at least 2.5 and an NCO content of 5 to 50 wt. % with B) 0.1 to 50 equivalent %, based on the equivalents of isocyanate groups present in component A), of a fluorine-containing alcohol component corresponding to the formula

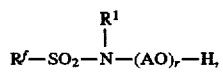 (I)

wherein $R^f$ represents a perfluoroalkyl group having 4 to 20 carbon atoms, $R^1$ represents an alkyl group having 1 to 6 carbon atoms, AO represents an alkylene oxide radical having 2 to 10 carbon atoms and r is a number from 1 to 3, C) 5 to 90 equivalent %, based on the equivalents of isocyanate groups present in component A), of a monohydric alcohol component containing one or more monohydric polyether alcohols which have a number average molecular weight of 150 to 5000 and an ethylene oxide content of 50 to 99.5 wt. %, and have been prepared by alkoxylation of a monohydric starter molecule, provided that component C) is present in an amount such that the resulting polyaddition compound contains at least 30 wt. % of ethylene oxide units incorporated via component C), D) 5 to 80 equivalent %, based on the equivalents of isocyanate groups present in component A), of an amine component containing at least one tertiary amine having a molecular weight of 88 to 250 and containing at least one isocyanate-reactive group and E) 0 to 40 equivalent %, based on the equivalents of isocyanate groups present in component A), of one or more compounds which contain one or more isocyanate-reactive groups, are different from components B) to D), and have ethylene oxide content of less than 50 wt. % and a number average molecular weight of 32 to 3000, at an isocyanate index of 80 to 200 to form urethane and optionally urea groups, and optionally reducing any NCO groups present in excess to a maximum content of 1.0 wt. % by means of secondary reactions carried out simultaneously or subsequently to the formation of the polyaddition compound.

2. The process of claim 1 wherein polyisocyanate component A) contains isocyanurate groups, has an average NCO functionality of 3 to 6 and an NCO content of 12 to 24 wt. % and is based on 2,4-diisocyanatotoluene or mixtures thereof with up to 35 wt. %, based on the weight of the mixture, of 2,6-diisocyanatotoluene.

3. The process of claim 1 wherein said polyaddition compound has a fluorine content of 0.7 to 20 wt. %, an ethylene oxide content of 50 to 85 wt. % and a content of tertiary amino groups of 5 to 100 milliequivalents per 100 g of resin solids.

4. The process of claim 2 wherein said polyaddition compound has a fluorine content of 0.7 to 20 wt. %, an ethylene oxide content of 50 to 85 wt. % and a content of tertiary amino groups of 5 to 100 milliequivalents per 100 g of resin solids.

5. A water-soluble polyaddition compound having a fluorine content of 0.5 to 50 wt. %, an ethylene oxide content of 30 to 95 wt. % and a content of tertiary amino groups of 2 to 200 milliequivalents per 100 g of resin solids, wherein said fluorine content is obtained from compounds corresponding to the formula

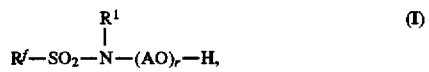 (I)

wherein $R^f$ represents a perfluoroalkyl group having 4 to 20 carbon atoms, $R^1$ represents an alkyl group having 1 to 6 carbon atoms, AO represents an alkylene oxide radical having 2 to 10 carbon atoms and r is a number from 1 to 3.

6. The polyaddition compound of claim 5 wherein said polyaddition compound has a fluorine content of 0.7 to 20 wt. %, an ethylene oxide content of 50 to 85 wt. % and a content of tertiary amino groups of 5 to 100 milliequivalents per 100 g of resin solids.

7. A water-soluble polyaddition compound containing perfluoroalkyl groups which is prepared by a process which comprises reacting A) a polyisocyanate component having an average NCO functionality of at least 2.5 and an NCO content of 5 to 50 wt. % with B) 0.1 to 50 equivalent %, based on the equivalents of isocyanate groups present in component A), of a fluorine-containing alcohol component corresponding to the formula

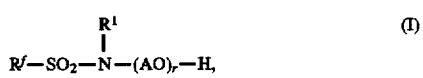
$$R^f-SO_2-N(R^1)-(AO)_r-H, \quad (I)$$

wherein $R^f$ represents a perfluoroalkyl group having 4 to 20 carbon atoms, $R^1$ represents an alkyl group having 1 to 6 carbon atoms, AO represents an alkylene oxide radical having 2 to 10 carbon atoms and r is a number from 1 to 3, C) 5 to 90 equivalent %, based on the equivalents of isocyanate groups present in component A), of a monohydric alcohol component containing one or more monohydric polyether alcohols which have a number average molecular weight of 150 to 5000 and an ethylene oxide content of 50 to 99.5 wt. %, and have been prepared by alkoxylation of a monohydric starter molecule, provided that component C) is present in an amount such that the resulting polyaddition compound contains at least 30 wt. % of ethylene oxide units incorporated via component C), D) 5 to 80 equivalent %, based on the equivalents of isocyanate groups present in component A), of an amine component containing at least one tertiary amine having a molecular weight of 88 to 250 and containing at least one isocyanate-reactive group and E) 0 to 40 equivalent %, based on the equivalents of isocyanate groups present in component A), of one or more compounds which contain one or more isocyanate-reactive groups, are different from components B) to D), and have ethylene oxide content of less than 50 wt. % and a number average molecular weight of 32 to 3000, at an isocyanate index of 80 to 200 to form urethane and optionally urea groups, and optionally reducing any NCO groups present in excess to a maximum content of 1.0 wt. % by means of secondary reactions carried out simultaneously or subsequently to the formation of the polyaddition compound.

8. The polyaddition compound of claim 7 wherein polyisocyanate component A) contains isocyanurate groups, has an average NCO functionality of 3 to 6 and an NCO content of 12 to 24 wt. % and is based on 2,4-diisocyanatotoluene or mixtures thereof with up to 35 wt. %, based on the weight of the mixture, of 2,6-diisocyanatotoluene.

9. The polyaddition compound of claim 7 wherein said polyaddition compound has a fluorine content of 0.7 to 20 wt. %, an ethylene oxide content of 50 to 85 wt. % and a content of tertiary amino groups of 5 to 100 milliequivalents per 100 g of resin solids.

10. The polyaddition compound of claim 8 wherein said polyaddition compound has a fluorine content of 0.7 to 20 wt. %, an ethylene oxide content of 50 to 85 wt. % and a content of tertiary amino groups of 5 to 100 milliequivalents per 100 g of resin solids.

11. An aqueous paint or coating coating composition containing one or more solid substances and the polyaddition compound of claim 5 as a dispersant.

12. An aqueous paint or coating coating composition containing one or more pigments and the polyaddition compound of claim 5 as a dispersant.

13. An aqueous paint or coating coating composition containing carbon black and the polyaddition compound of claim 5 as a dispersant.

* * * * *